(12) United States Patent
Krishnan et al.

(10) Patent No.: US 10,359,303 B1
(45) Date of Patent: Jul. 23, 2019

(54) SYSTEM FOR VEHICLE SENSOR ASSEMBLY

(71) Applicant: Ford Global Technologies, LLC, Dearborn, MI (US)

(72) Inventors: Venkatesh Krishnan, Canton, MI (US); Segundo Baldovino, Novi, MI (US); Mario D. Iaquinta, Bloomfield Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/892,683

(22) Filed: Feb. 9, 2018

(51) Int. Cl.
| G01D 11/00 | (2006.01) |
| G01D 11/24 | (2006.01) |
| B60R 11/04 | (2006.01) |

(52) U.S. Cl.
CPC ............ *G01D 11/245* (2013.01); *B60R 11/04* (2013.01); *B60Y 2306/05* (2013.01); *B60Y 2410/10* (2013.01)

(58) Field of Classification Search
CPC .............. G01D 11/245; B60Y 2306/05; B60Y 2410/10; B60R 11/04; F25B 21/02; F25B 1/00; F25B 2321/023; G01S 7/4813; G01S 17/936; F28F 7/02; F28F 2250/08
See application file for complete search history.

(56) References Cited

U.S. PATENT DOCUMENTS

| 5,765,635 | A | * | 6/1998 | Rhee | ................. B60H 1/00742 165/203 |
| 10,222,477 | B2 | * | 3/2019 | Keilaf | ..................... G01S 17/89 |
| 2011/0216304 | A1 | * | 9/2011 | Hall | ..................... G01S 7/4813 356/4.01 |
| 2012/0162428 | A1 | | 6/2012 | Wee | |
| 2017/0261273 | A1 | | 9/2017 | Maranville et al. | |
| 2017/0305360 | A1 | * | 10/2017 | Zajac | ..................... B60R 11/04 |
| 2018/0149742 | A1 | * | 5/2018 | Izadian | .................. G01S 13/66 |
| 2018/0150083 | A1 | * | 5/2018 | Izadian | ............... G05D 1/0088 |
| 2018/0189683 | A1 | * | 7/2018 | Newman | ............... G06Q 10/02 |
| 2018/0201138 | A1 | * | 7/2018 | Yellambalase | ........ B60L 3/0046 |
| 2018/0208016 | A1 | * | 7/2018 | O'Brien | ............ B60H 1/00207 |
| 2019/0003895 | A1 | * | 1/2019 | Krishnan | ............. G01S 13/931 |

FOREIGN PATENT DOCUMENTS

| CN | 10344868 A | 12/2013 |
| DE | 102016015317 A1 | 7/2017 |
| EP | 2605043 B1 | 7/2014 |
| JP | 2016119495 A | 6/2016 |

* cited by examiner

*Primary Examiner* — Francis C Gray
(74) *Attorney, Agent, or Firm* — Frank A. MacKenzie; Bejin Bieneman PLC

(57) ABSTRACT

A system includes a vehicle, a housing supported by the vehicle, and a fan supported by the housing. The housing includes an intake port and a plurality of exhaust ports spaced from each other. The housing defines a furcated flow path from the intake port to the exhaust ports. Sensors are disposed adjacent the exhaust ports, respectively. Each sensor is disposed along the furcated flow path.

20 Claims, 6 Drawing Sheets

SYSTEM FOR VEHICLE SENSOR ASSEMBLY

BACKGROUND

Vehicle, such as autonomous or semi-autonomous vehicles, typically include a variety of sensors. Some sensors detect internal states of the vehicle, for example, wheel speed, wheel orientation, and engine and transmission variables. Some sensors detect the position or orientation of the vehicle, for example, global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. Some sensors detect the external world, for example, radar sensors, scanning laser range finders, light detection and ranging (LIDAR) devices, and image processing sensors such as cameras. A LIDAR device detects distances to objects by emitting laser pulses and measuring the time of flight for the pulse to travel to the object and back. Some sensors are communications devices, for example, vehicle-to-infrastructure (V2I) or vehicle-to-vehicle (V2V) devices. Sensor operation can be affected by temperature, e.g., a sensor that is too hot may not operate properly.

DETAILED DESCRIPTION

Figure 1:
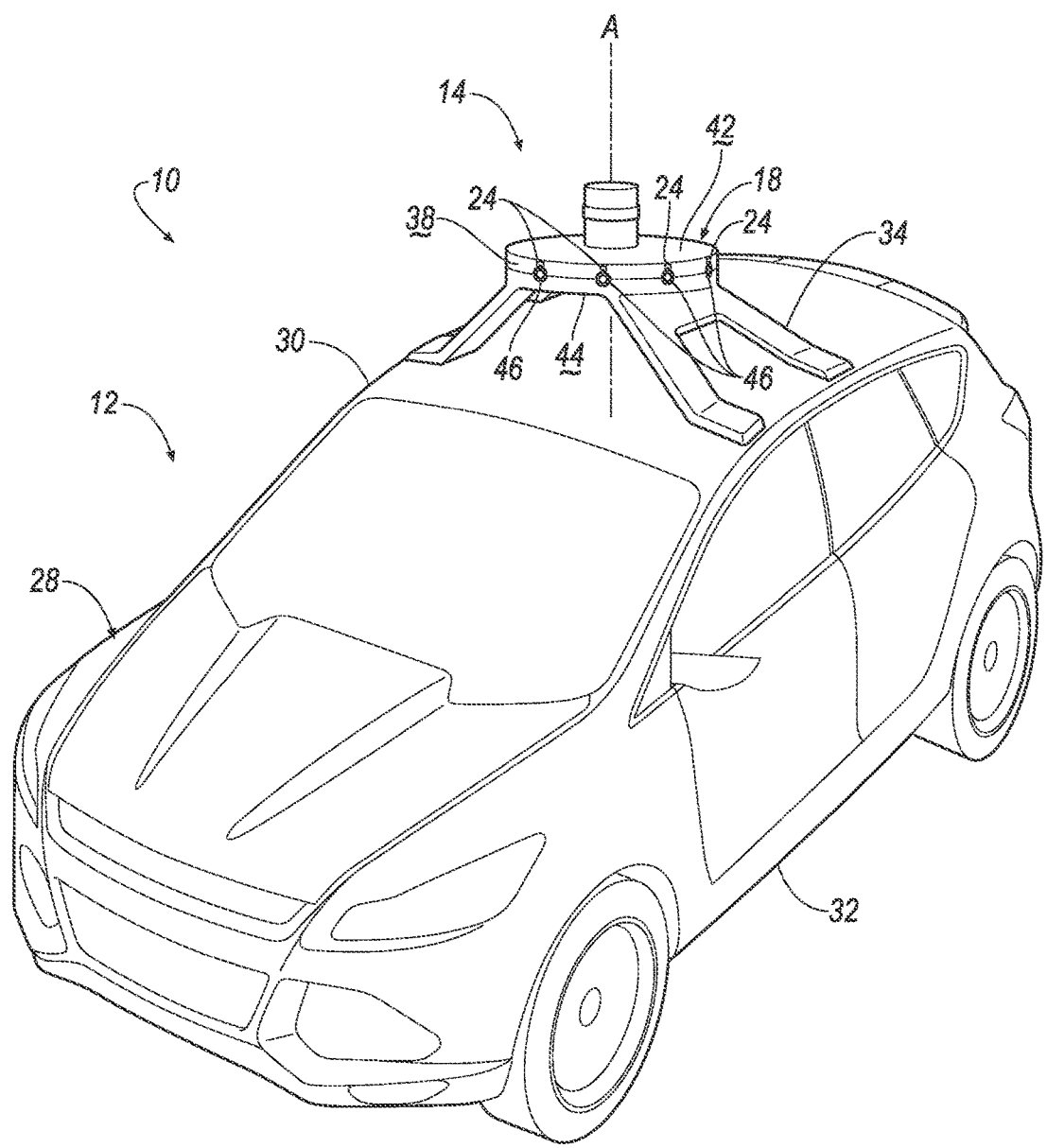
FIG. 1 is a perspective view of a vehicle including a roof and a sensor assembly having a housing supported by the roof and spaced from the roof.

A system includes a vehicle, a housing supported by the vehicle, and a fan supported by the housing. The housing includes an intake port and a plurality of exhaust ports spaced from each other. The housing defines a furcated flow path from the intake port to the exhaust ports. Sensors are disposed adjacent the exhaust ports, respectively. Each sensor is disposed along the furcated flow path.

The housing may include a top and a bottom spaced from the top. The bottom may be disposed between the top of the housing and the vehicle. The intake port may be disposed in the bottom of the housing.

The housing may include a top and a bottom spaced from the top. The bottom may be disposed between the top of the housing and the vehicle. The housing may include vanes adjacent to the sensors, respectively. The vanes may extend from the bottom of the housing toward the top of the housing.

The housing may include vanes adjacent to each of the sensors, respectively. The vanes may be spaced from each other in an annular pattern. The furcated flow path may extend between each of the vanes.

The housing may include an inner wall. The vanes may each be spaced radially outwardly from the inner wall to define an annular space between the inner wall and the vanes. The furcated flow path may extend from the intake port, along the annular space, and between each of the vanes to the exhaust ports.

The sensors may each be disposed radially outwardly relative to the vanes.

The sensors may be spaced from each other in an annular pattern.

The exhaust ports may each be disposed radially outwardly relative to the sensors.

Each exhaust port may be a one-way exhaust vent.

The system may include a controller in communication with the fan and a thermocouple disposed in the housing. The thermocouple may be in communication with the controller.

A sensor assembly includes a housing and a fan supported by the housing. The housing includes an intake port and a plurality of exhaust ports spaced from each other. The housing defines a furcated flow path from the intake port to the exhaust ports. Sensors are disposed adjacent the exhaust ports, respectively. Each sensor is disposed along the furcated flow path.

The housing may include a top and a bottom spaced from the top. The intake port may be disposed in the bottom of the housing.

The housing may include a top and a bottom spaced from the top. The housing may include vanes adjacent to the sensors, respectively. The vanes may extend from the bottom of the housing toward the top of the housing.

The housing may include vanes adjacent to each of the sensors, respectively. The vanes may be spaced from each other in an annular pattern. The furcated flow path may extend between each of the vanes.

The sensors may each be disposed radially outwardly relative to the vanes.

The sensors may be spaced from each other in an annular pattern.

The exhaust ports may each be disposed radially outwardly relative to the sensors.

Each exhaust port may be a one-way exhaust vent.

The sensor assembly may include a controller in communication with the fan and a thermocouple disposed in the housing. The thermocouple may be in communication with the controller.

With reference to the Figures, wherein like numerals indicate like parts throughout the several views, a system 10 is generally shown. The system 10 includes a vehicle 12 and a sensor assembly 14 supported by the vehicle 12 having a plurality of sensors 16. The sensor assembly 14 provides active cooling of the sensors 16 to prevent or reduce overheating of the sensors 16. The active cooling can be achieved in an efficient manner by using air from the ambient environment. For example, the sensor assembly 14 may extract air external to each of the vehicle 12 and the sensor assembly 14. The air is directed through the sensor assembly 14 across each of the sensors 16 to cool the sensors 16. After the air flows across the sensors 16, the air is expelled from the sensor assembly 14 to the ambient environment.

Figure 3:
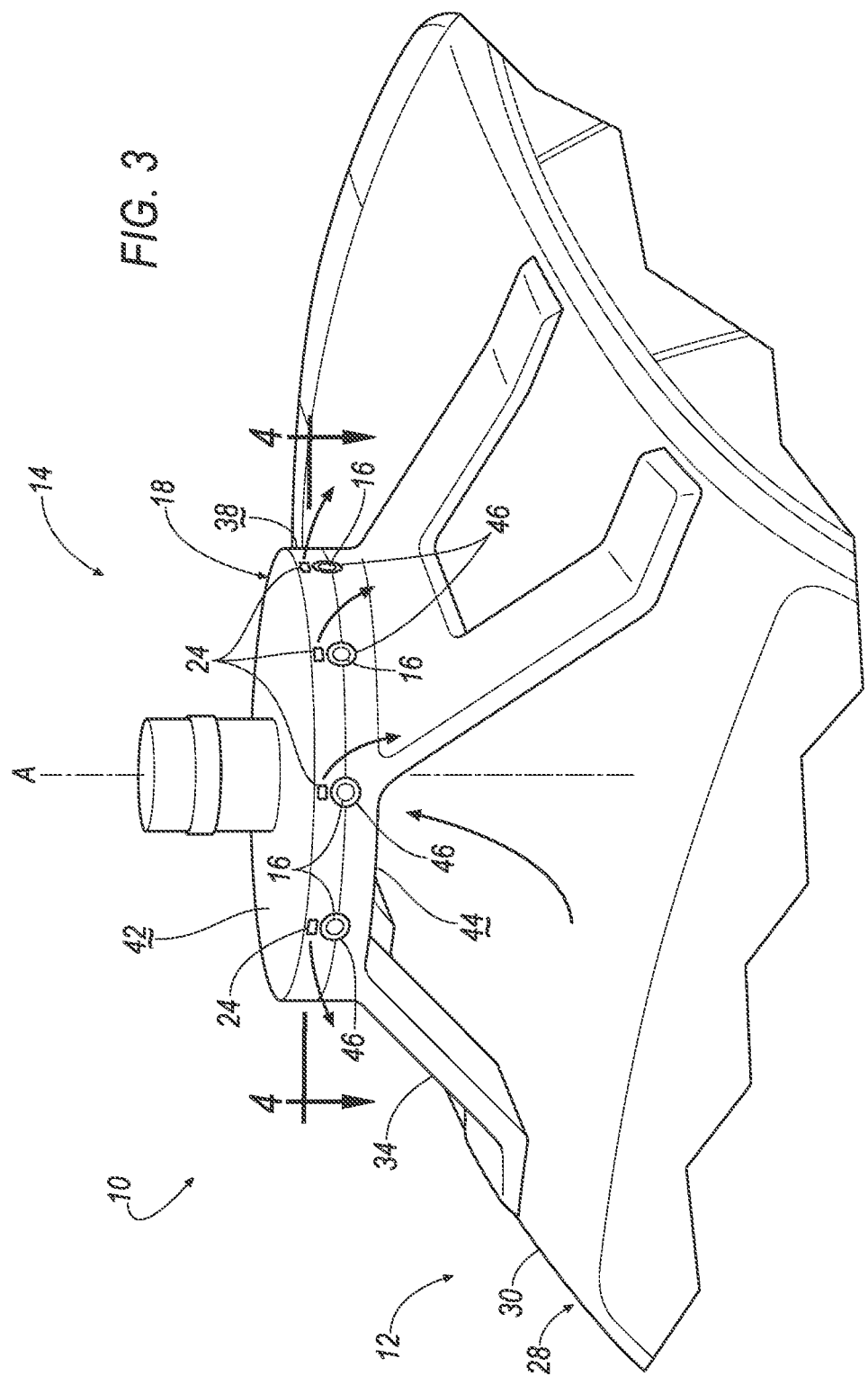
FIG. 3 is a perspective view of the sensor assembly of FIG. 1.
Figure 4:
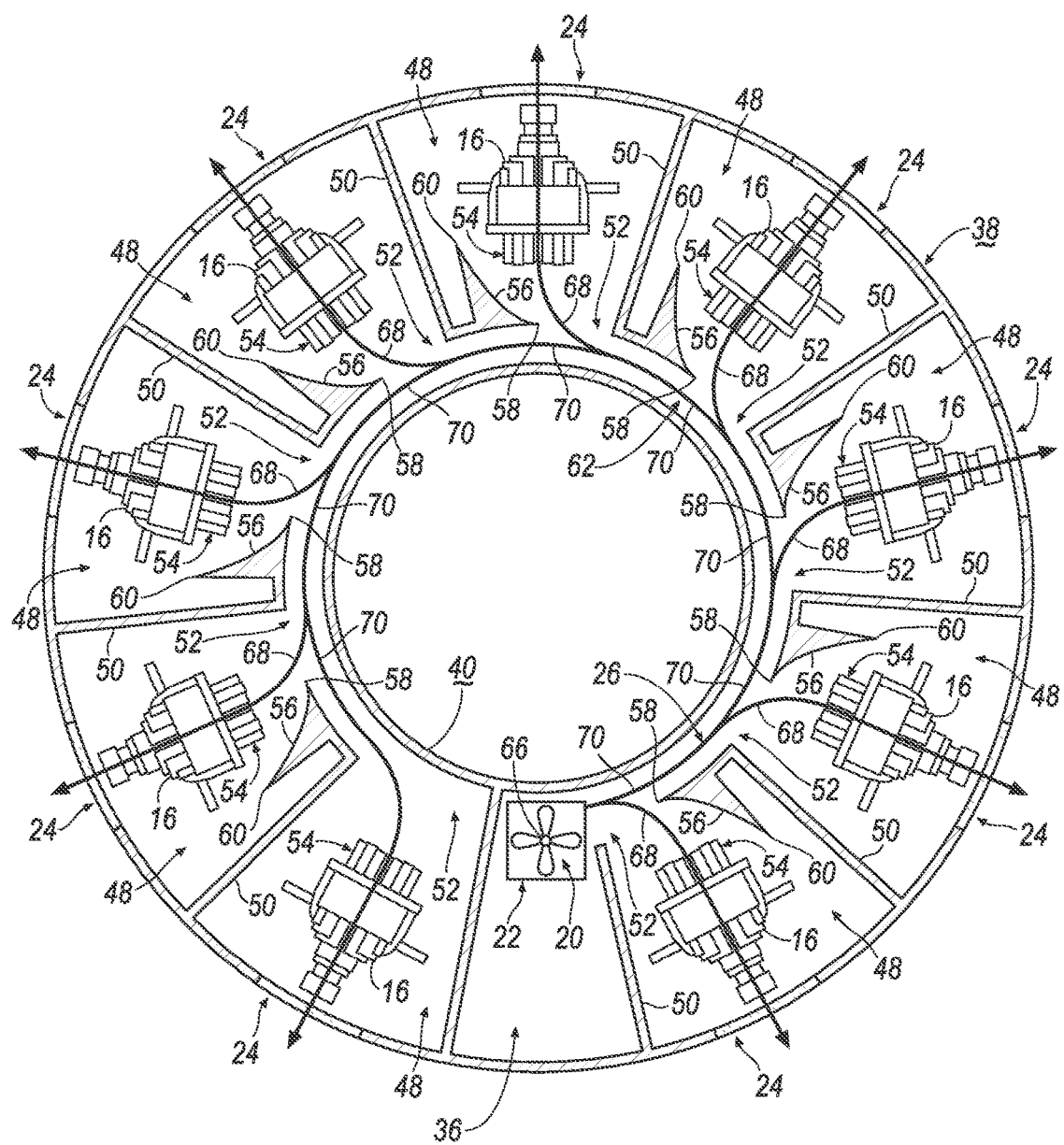
FIG. 4 is a cross sectional view along line 4 of FIG. 3 of a cavity of a housing of the sensor assembly.

The sensor assembly 14 includes a housing 18 and a fan 20 supported by the housing 18. The plurality of sensors 16 are disposed in the housing 18. The housing 18 includes an intake port 22 and a plurality of exhaust ports 24 spaced from each other. The housing 18 defines a furcated flow path 26 from the intake port 22 to the exhaust ports 24. One sensor 16 is disposed adjacent to each exhaust port 24. Each sensor 16 is disposed along the furcated flow path 26. As the temperature inside the housing 18, e.g., the temperature of each sensor 16, increases, the air from the ambient environment may be cooler than the air inside the housing 18. The fan 20 may be actuated to extract air from the ambient environment through the intake into the housing 18, as shown in FIG. 3, and to direct air along the furcated flow path 26 to each of the exhaust ports 24, as shown in FIG. 4. By circulating the cooler air from the ambient environment across each sensor 16 in the housing 18, the cooler air reduces the internal temperature of the housing 18. Specifically, the cooler air reduces the temperature of each sensor 16 within the housing 18.

With reference to FIG. 1, the vehicle 12 may be an autonomous vehicle. A computer can be configured to operate the vehicle 12 independently of the intervention of a human driver, completely or to a lesser degree. The computer may be programmed to operate the propulsion, brake system, steering, and/or other vehicle systems. For the purposes of this disclosure, autonomous operation means the computer controls the propulsion, brake system, and steering; semi-autonomous operation means the computer controls one or two of the propulsion, brake system, and steering and a human driver controls the remainder; and nonautonomous operation means the human driver controls the propulsion, brake system, and steering.

With continued reference to FIG. 1, the vehicle 12 may include a vehicle body 28 defining a passenger cabin (not numbered) to house occupants, if any, of the vehicle 12. The vehicle body 28 may include a roof 30 and a floor 32 spaced from the roof 30. The floor 32 may, for example, be spaced from the roof 30 along an axis A. Each of the roof 30 and the floor 32 may extend across the passenger cabin, i.e., from one side of the vehicle 12 to the other side of the vehicle 12. The roof 30 may be supported by a plurality of pillars (not numbered) extending from the roof 30 to the floor 32.

With reference to FIG. 3, the roof 30 may support the sensor assembly 14, and specifically, may support the housing 18. The housing 18 may be spaced from the roof 30, e.g., along the axis A. In this situation, the sensor assembly 14 may extract air from the ambient environment between the housing 18 and the roof 30 of the vehicle 12. The housing 18 may be mounted to the roof 30, as set forth below.

Figure 2:
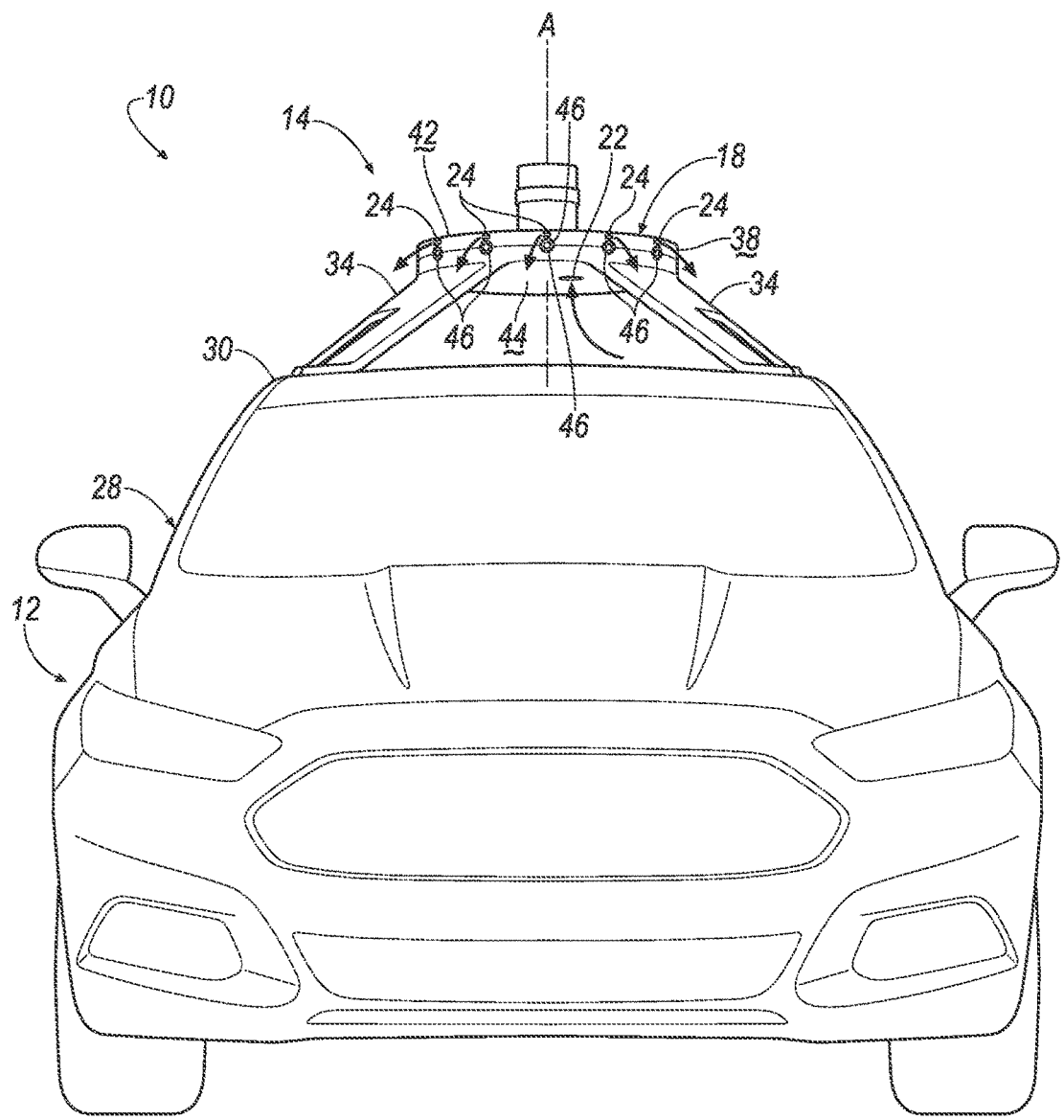
FIG. 2 is a front view of the vehicle and the sensor assembly.

With reference to FIG. 2, the sensor assembly 14 may include brackets 34 extending from the roof 30 to the housing 18. The brackets 34 may, for example, extend transverse to the axis A. As another example, the brackets 34 may extend along the axis A from the roof 30 to the housing 18. The brackets 34 may be fixed to each of the roof 30 and the housing 18 in any suitable manner, e.g. fasteners, welding, etc. The brackets 34 may be formed of any suitable material, e.g., metal, to support the housing 18 on the roof 30.

With reference to FIG. 4, the housing 18 may include an outer wall 38 and an inner wall 40 spaced from each other. The inner wall 40 may extend circumferentially about the axis A. The outer wall 38 may extend annularly about the inner wall 40. In other words, the outer wall 38 may encircle the inner wall 40.

With reference to FIG. 2, the housing 18 may include a top 42 and a bottom 44 spaced from the top 42, e.g., along the axis A. The top 42 and the bottom 44 may each extend about the axis A to the outer wall 38. The bottom 44 may be disposed between the top 42 and the roof 30 of the vehicle 12. Additionally, the bottom 44 may be spaced from the roof 30.

The housing 18 may enclose and define a cavity 36. The cavity 36 may extend along the axis A from the top 42 to the bottom 44 and annularly about the axis A from the inner wall 40 to the outer wall 38. The housing 18 may shield contents of the cavity 36 from external elements such as wind, rain, debris, etc. The housing 18 may have any suitable shape, e.g., circle, square, rectangle, ellipse, etc.

With continued reference to FIG. 2, the outer wall 38 may include a plurality of windows 46. The windows 46 may be spaced from each other about the axis A. For example, the windows 46 may be spaced from each other in an annular pattern. In other words, the spacing between adjacent windows 46 may be repeatable about the axis A, e.g., around the outer wall 38. The outer wall 38 may include any suitable number of windows 46.

With reference to FIG. 4, the cavity 36 may include a plurality of compartments 48 disposed along the outer wall 38, e.g., annularly about the axis A. The compartments 48 may be disposed adjacent to the windows 46, respectively. In other words, one compartment 48 may be disposed adjacent to each window 46.

With continued reference to FIG. 4, the plurality of compartments 48 may each include sides 50 spaced from each other and extending from the bottom 44 of the housing 18 toward the top 42 of the housing 18. Additionally, the sides 50 may extend from the outer wall 38 toward the inner wall 40, i.e., the sides 50 may terminate between the outer wall 38 and the inner wall 40. As one example, adjacent compartments 48 may share one side 50. In other words, one side 50 may be common for adjacent compartments 48.

As another example, the sides 50 of adjacent compartments 48 may be unique, i.e., spaced from each other. As yet another example, the sides 50 of adjacent compartments 48 may converge toward each other from the outer wall 38 toward the inner wall 40. The compartments 48 may include an open side 52 facing the inner wall 40. The open side 52 may be disposed between the outer wall 38 and the inner wall 40. The open side 52 may extend from one side 50 to the other side 50 of the compartment 48.

With continued reference to FIG. 4, the sensor assembly 14 includes the sensors 16. The sensors 16 may be attached to the housing 18 in the cavity 36. The sensors 16 are disposed inside the housing 18, i.e., in the cavity 36. For example, each sensor 16 may be disposed in one of the plurality of compartments 48. In this situation, each sensor 16 may be disposed adjacent to one of the windows 46. In other words, the sensors 16 may be spaced from each other in the annular pattern. The spacing between the sensors 16 may be repeatable about the axis A. The sensors 16 are each aimed at one of the windows 46 and may each have a field of view through one of the windows 46.

The sensors 16 may detect the location and/or orientation of the vehicle 12. For example, the sensors 16 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 16 may detect the external world, e.g., objects and/or characteristics of surroundings of the vehicle 12, such as other vehicles, road lane markings, traffic lights and/or signs, pedestrians, etc. For example, the sensors 16 may include radar sensors, scanning laser range finders, light detection and ranging (LIDAR) devices, and image processing sensors such as cameras. The sensors 16 may include communications devices, for example, vehicle-to-infrastructure (V2I) or vehicle-to-vehicle (V2V) devices.

In particular, the sensors 16 may be cameras arranged to collectively cover a 360° horizontal field of view.

Each sensor 16 may include a plurality of fins 54 spaced from each other on the sensor 16. The plurality of fins 54 may extend from the sensor 16 toward the furcated flow path 26. For example, the plurality of fins 54 may extend from the sensor 16 away from the window 46, i.e., toward the inner wall 40 of the housing 18. Alternatively, the plurality of fins 54 may extend from the sensor 16 toward the top 42 of the housing 18. The plurality of fins 54 may be made of any suitable material for conducting heat, e.g., metal. For example, the plurality of fins 54 may conduct heat away from the sensor 16 during operation of the sensor 16. The plurality of fins 54 may be disposed on a heatsink.

With reference to FIG. 4, the housing 18 may include vanes 56 spaced from each other in the annular pattern, i.e., the spacing between the vanes 56 may be repeatable about the axis A. For example, the vanes 56 may be disposed adjacent to the sensors 16, respectively. The sensors 16 may be disposed radially outwardly relative to the vanes 56. In other words, each sensor 16 may be disposed between one of the vanes 56 and the outer wall 38. The vanes 56 may be disposed on the open side 52 of the compartment 48. In other words, the vanes 56 may be positioned such that the vanes 56 direct air flow into the compartment 48, i.e., across each sensor 16, as set forth further below. The vanes 56 may be attached to one side 50 of one compartment 48, respectively. Alternatively, the vanes 56 may be spaced from each side 50 of one compartment 48, respectively.

Each of the vanes 56 may extend from the bottom 44 of the housing 18 toward the top 42 of the housing 18. Additionally, each vane 56 may extend from a first end 58 to a second end 60 spaced from the first end 58. The second end 60 of the vane 56 may be disposed between the first end 58 and the outer wall 38. In other words, the vane 56 may extend toward the sensor 16. Specifically, each vane 56 may curve towards the sensor 16 from the first end 58 to the second end 60. In other words, the vanes 56 may be concave relative to the sensors 16. The curvature of the vanes 56 may assist in splitting the air flow and direction a portion of the air flow across the sensor 16, as set forth further below.

With continued reference to FIG. 4, the vanes 56 may be disposed radially outwardly relative to the inner wall 40 to define an annular space 62 between the inner wall 40 and the vanes 56. For example, the first end 58 of the vanes 56 may be spaced from the inner wall 40. In this situation, the first end 58 of the vanes 56 and the inner wall 40 define the annular space 62. The annular space 62 may extend around the inner wall 40, i.e., about the axis A.

The vanes 56 may be formed of any suitable material to direct fluid flow. For example, the vanes 56 may be metal, e.g., steel, aluminum, etc. As another example, the vanes 56 may be plastic, e.g., polyurethane, and poly-vinyl-chloride, polyethylene, etc.

The plurality of exhaust ports 24 may be disposed radially outwardly relative to the sensors 16. In other words, the plurality of exhaust ports 24 may be disposed on the outer wall 38 of the housing 18. For example, one exhaust port 24 may be disposed adjacent to each window 46 of the outer wall 38, as shown in FIG. 3. In other words, one exhaust port 24 may be disposed adjacent to each compartment 48, i.e., sensor 16. In other words, the plurality of exhaust ports 24 may be spaced from each other in the annular pattern. The exhaust ports 24 may face the respective window 46. In other words, the air exiting the exhaust ports 24 may flow in front of and/or to the respective window 46 to create an air curtain and/or to blow dirt, precipitation, etc., from the windows 46.

The exhaust port 24 may be a one-way exhaust vent. In this situation, the exhaust port 24 may allow air to flow in one direction, e.g., out of the cavity 36 of the housing 18 to the environment. In other words, the exhaust port 24 may prevent air flow from the environment into the cavity 36 of the housing 18 through the exhaust port 24. The exhaust port 24 may be any suitable type of one-way exhaust vent. For example, the exhaust port 24 may include a damper, baffles, louvers, etc. to prevent air flow into the cavity 36 of the housing 18.

With reference to FIG. 3, the intake port 22 may be disposed at the bottom 44 of the housing 18. Additionally, the intake port 22 may be disposed between the outer wall 38 and the inner wall 40. For example, the intake port 22 may be disposed in the annular space 62 of the housing 18, i.e., between the first end 58 of the vanes 56 and the inner wall 40. The intake port 22 may allow air to flow from the environment into the cavity 36 of the housing 18. The intake port 22 may prevent fluid flow from the cavity 36 of the housing 18 to the environment. The intake port 22 may include a filter (not shown) to prevent or reduce contaminants from entering the cavity 36 through the intake. The filter may be any suitable type of air filter, e.g., an ionic filter, a high efficiency particulate absorbing filter, a carbon filter, etc.

The fan 20 may be in fluid communication with the environment surrounding the housing 18. The fan 20 may be disposed inside the housing 18, i.e., in the cavity 36. The sensor assembly 14 may include any suitable number of fans, e.g., one or more. As one example, the sensor assembly 14 may include one fan 20. In this situation, the fan 20 may be supported by the bottom 44 of the housing 18. In other words, the fan 20 may be attached to the bottom 44 of the housing 18. The fan 20 may, for example, be disposed adjacent to the intake port 22; i.e., nothing is disposed between the fan 20 and the intake port 22, as shown in FIG. 4. As another example, the sensor assembly 14 may include a plurality of the fans 20 supported by the outer wall 38 of the housing 18. In this situation, one fan 20 may be disposed adjacent to each exhaust port 24; i.e., nothing is disposed between each fan 20 and one of the exhaust ports 24. The fan 20 may be attached to the housing 18 in any suitable fashion, e.g., fasteners, welding, etc.

With reference to FIG. 4, the fan 20 includes a plurality of blades, e.g., a propeller, impeller, etc., to generate airflow. The fan 20 may include a motor 66 for driving the blades, e.g., rotationally. The motor 66 may be of any suitable type, e.g., an electric motor.

With continued reference to FIG. 4, the fan 20 is positioned to direct airflow into the cavity 36 through the intake port 22, across all sensors 16, and out of the cavity 36 through each exhaust port 24. The fan 20 may, for example, extract air from between the bottom 44 of the housing 18 and the roof 30 through the intake port 22. In other words, the housing 18 is not in fluid communication with the passenger cabin. When the fan 20 is adjacent the intake port 22, the fan 20 may push air through the cavity 36 of the housing 18 from the intake port 22 to the exhaust port 24. Alternatively, when one fan 20 is adjacent each exhaust port 24, each fan 20 may pull air from between the roof 30 and the housing 18 through the cavity 36 of the housing 18 from the intake port 22 and propel the air to the environment through one of the exhaust ports 24.

With continued reference to FIG. 4, the housing 18 may define the furcated flow path 26 extending from the intake port 22, along the annular space 62, and between each of the vanes 56 to the exhaust ports 24. For purposes of this disclosure, "furcated" means a flow path that is divided into multiple branches. The furcated flow path 26 extends between each of the vanes 56. In other words, the furcated flow path 26 is split, i.e., be divided, at each vane 56. For example, the furcated flow path 26 may enter the annular space 62 through the intake port 22 as a unitary flow path. Upon reaching each vane 56, the furcated flow path 26 may be divided into two branches 68, 70. The one branch 68 may be directed by the vane 56 into one compartment 48. In other words, the one branch 68 may flow through the compartment 48, across the sensor 16, and out of the cavity 36 through the exhaust port 24 in the compartment 48. The other branch 70 may continue through the annular space 62 to the next vane 56. When the furcated flow path 26 reaches the next vane 56, the furcated flow path 26 may again be divided into two branches 68, 70 as above. The splitting of the furcated flow path 26 into two branches 68,70 may continue until the furcated flow path 26 reaches the last compartment 48, i.e., the compartment 48 farthest from the intake port 22 along the annular space 62. When the furcated flow path 26 reaches the last compartment 48, the remaining air may be directed across the sensor 16 in the compartment 48 and out of the cavity 36 through the exhaust port 24 of the compartment 48.

The sensor assembly 14 may include a temperature sensor 72 disposed in the cavity 36. The temperature sensor 72 is positioned to detect the temperature inside the housing 18, i.e., in the cavity 36. The temperature sensor 72 detects a temperature of a surrounding environment or an object in contact with the temperature sensor 72. The temperature sensor 72 may be any device that generates an output correlated with temperature, e.g., a thermometer, a bimetallic strip, a thermistor, a thermocouple, a resistance thermometer, a silicon bandgap temperature sensor, etc. In particular, the temperature sensor 72 may be a thermocouple. The sensor assembly 14 may include any suitable number of temperature sensors 72. For example, the sensor assembly 14 may include one temperature sensor 72 contacting each of the sensors 16. As another example, the sensor assembly 14 may include one temperature sensor 72 disposed in the cavity 36.

Figure 5:
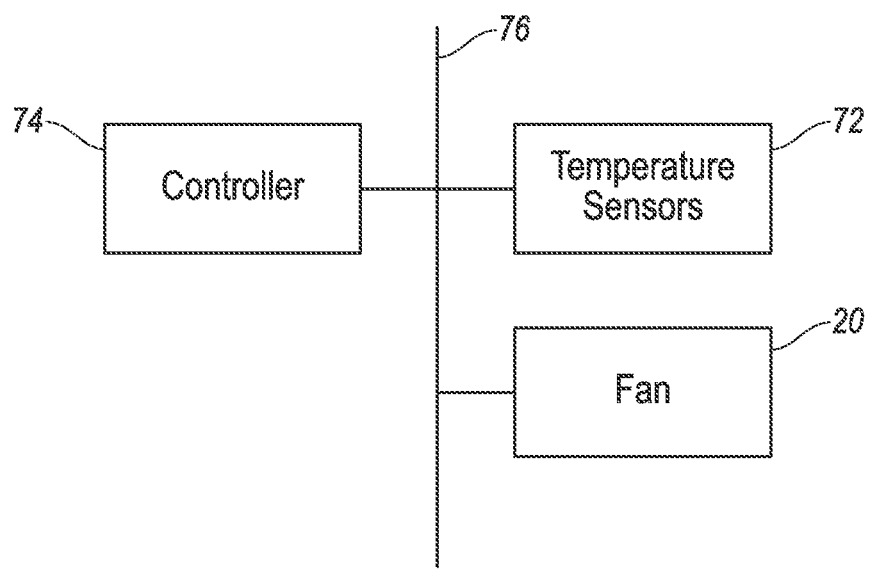
FIG. 5 is a block diagram of a control system for the sensor assembly of FIG. 1.

With reference to FIG. 5, the vehicle 12 may include a controller 74. The controller 74 is a microprocessor-based controller. The controller 74 includes a processor, memory, etc. The memory of the controller 74 includes memory for storing instructions executable by the processor as well as for electronically storing data and/or databases. The controller 74 may be the same as the computer for autonomously or semi-autonomously operating the vehicle 12, or the controller 74 may be a different computer than the computer for autonomously or semi-autonomously operating the vehicle 12.

With continued reference to FIG. 5, the controller 74 may transmit and receive data through a communications network 76 such as a controller area network (CAN) bus, Ethernet, WiFi, Local Interconnect Network (LIN), onboard diagnostics connector (OBD-II), and/or by any other wired or wireless communications network 76. The controller 74 may be in communication with the fan 20 and the temperature sensor 72, as well as possibly other components, via the communications network 76.

Figure 6:
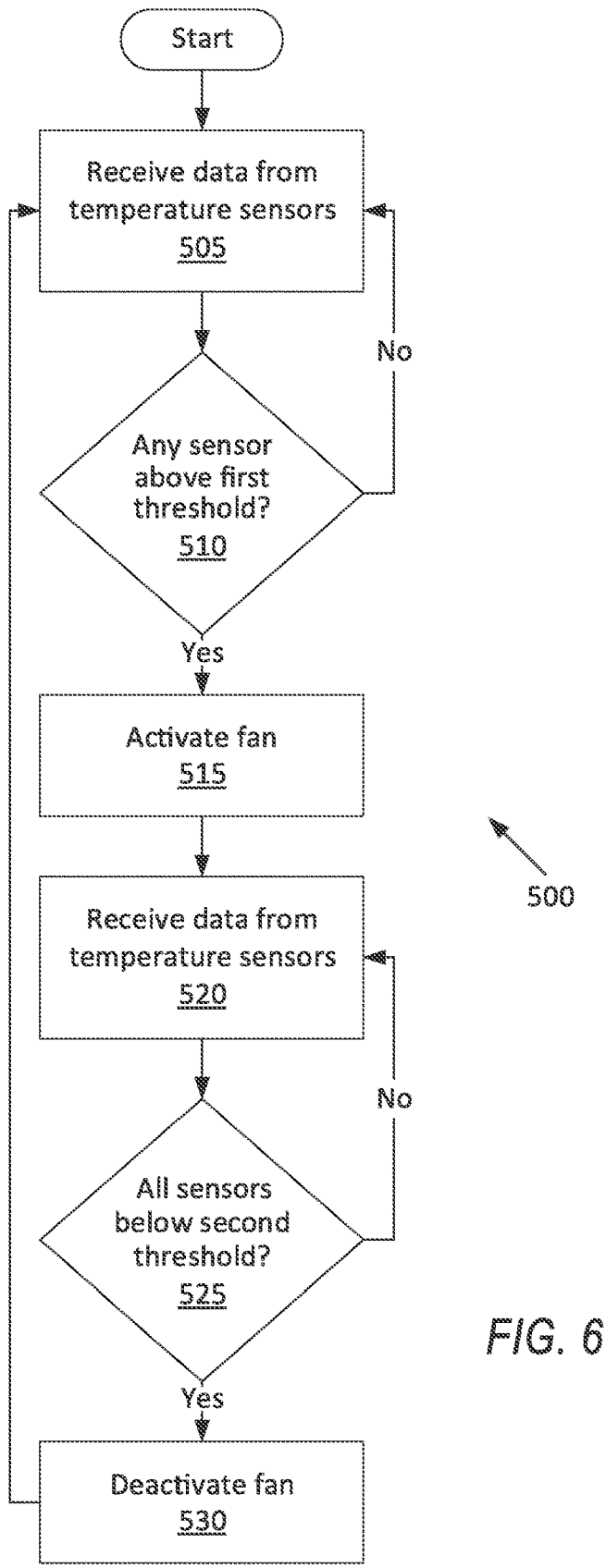
FIG. 6 is a process flow diagram of an example process for regulating the temperatures of sensors of the sensor assembly of FIG. 1.

FIG. 6 is a flow diagram of an exemplary process 500 for regulating the temperature of the sensors 16 of the sensor assembly 14. In general, as described in more detail below, the controller 74 is programmed to activate the fan 20 upon determining that a temperature of the at least one of the sensors 16 is above a first threshold and deactivate the fan 20 upon determining that the temperature of all the sensors 16 is below a second threshold. The sensor assembly 14 thus provides active cooling to keep all the sensors 16 within a range of temperatures below the first threshold and generally above the second threshold. The memory of the controller 74 stores executable instructions for performing the steps of the process 500.

The process 500 begins in a block 505, in which the controller 74 receives data from the temperature sensor 72 indicating the temperature of each of the sensors 16. The data may include the temperatures in any units of temperature, e.g., Fahrenheit or Celsius, or in units of another quantity that is correlated with temperature, e.g., volts if the temperature sensor 72 is a thermocouple.

Next, in a decision block 510, the controller 74 determines whether a temperature of at least one of the sensors 16 is above the first threshold based on the data from the temperature sensor 72. The first threshold is chosen to be below a temperature at which the sensors 16 may overheat and/or malfunction. The first threshold is typically expressed in the same units as the data indicating the temperature of the sensors 16. The first threshold may be the same regardless of which of the sensors 16 exceeds the first threshold. If the temperature of each of the sensors 16 is below the first threshold, the process 500 returns to the block 505 to continue monitoring the temperature of the sensors 16.

Next, if the temperature of at least one of the sensors 16 is above the first threshold, in a block 515, the controller 74 activates the fan 20. The controller 74 instructs the motor 66 of the fan 20 to rotate the blades so that air is drawn in through the intake port 22; travels along the furcated flow path 26, i.e., across the sensors 16; and exits through each exhaust port 24.

Next, in a block 520, the controller 74 receives data from the temperature sensor 72 indicating the temperatures of each of the sensors 16, as described above with respect to the block 505.

Next, in a decision block 525, the controller 74 determines whether the temperature of all the sensors 16 are below the second threshold based on the data from the temperature sensor 72. The second threshold is chosen to be above a temperature at which the sensors 16 may operate inefficiently or sluggishly from being too cold and sufficiently far from the first threshold that the fan 20 does not turn on and off too frequently, e.g., at a frequency that causes the fan 20 to wear out too quickly. The second threshold is typically expressed in the same units as the data indicating the temperature of the sensors 16. If the temperature of at least one of the sensors 16 is above the second threshold, the process 500 returns to the block 520 to continue monitoring the temperature of the sensors 16 while cooling the sensors 16 by running the fan 20.

Next, in a block 530, if the temperature of all the sensors 16 is below the second threshold, the controller 74 deactivates the fan 20. The controller 74 instructs the motor 66 of the fan 20 to cease rotating so that the fan 20 is no longer contributing to the airflow through the cavity 36. Airflow may still be caused by the motion of the vehicle 12. After the block 530, the process 500 returns to the block 505 to continue monitoring the temperature of the sensors 16.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system comprising:
a vehicle;
a housing supported by the vehicle;
a fan supported by the housing;
the housing including an intake port and a plurality of exhaust ports spaced from each other, the housing defining a furcated flow path from the intake port to the exhaust ports; and
a plurality of sensors each disposed adjacent the exhaust ports, respectively, each sensor disposed along the furcated flow path.

2. The system of claim 1, wherein the housing includes a top and a bottom spaced from the top, the bottom disposed between the top of the housing and the vehicle, and wherein the intake port is disposed in the bottom of the housing.

3. The system of claim 1, wherein the housing includes a top and a bottom spaced from the top, the bottom disposed between the top of the housing and the vehicle, and wherein the housing includes vanes adjacent to the sensors, respectively, the vanes extending from the bottom of the housing toward the top of the housing.

4. The system of claim 1, wherein the housing includes vanes adjacent to each of the sensors, respectively, the vanes being spaced from each other in an annular pattern, the furcated flow path extending between each of the vanes.

5. The system of claim 4, wherein the housing includes an inner wall, the vanes each being spaced radially outwardly from the inner wall to define an annular space between the inner wall and the vanes, the furcated flow path extending from the intake port, along the annular space, and between each of the vanes to the exhaust ports.

6. The system of claim 4, wherein the sensors are each disposed radially outwardly relative to the vanes.

7. The system of claim 6, wherein the sensors are spaced from each other in an annular pattern.

8. The system of claim 6, wherein the exhaust ports are each disposed radially outwardly relative to the sensors.

9. The system of claim 1, wherein each exhaust port is a one-way exhaust port.

10. The system of claim 1, further comprising a controller in communication with the fan, and a thermocouple disposed in the housing, the thermocouple in communication with the controller.

11. A sensor assembly comprising:
a housing;
a fan supported by the housing;
the housing including an intake port and a plurality of exhaust ports spaced from each other, the housing defining a furcated flow path from the intake port to the exhaust ports; and
a plurality of sensors each disposed adjacent the exhaust ports, respectively, each sensor disposed along the furcated flow path.

12. The sensor assembly of claim 11, wherein the housing includes a top and a bottom spaced from the top, and wherein the intake port is disposed in the bottom of the housing.

13. The sensor assembly of claim 11, wherein the housing includes a top and a bottom spaced from the top, and wherein the housing includes vanes adjacent to the sensors, respectively, the vanes extending from the bottom of the housing toward the top of the housing.

14. The sensor assembly of claim 11, wherein the housing includes vanes adjacent to each of the sensors, respectively, the vanes being spaced from each other in an annular pattern, the furcated flow path extending between each of the vanes.

15. The sensor assembly of claim 14, wherein the housing includes an inner wall, the vanes each being spaced radially outwardly from the inner wall to define an annular space between the inner wall and the vanes, the furcated flow path extending from the intake port, along the annular space, and between each of the vanes to the exhaust ports.

16. The sensor assembly of claim 14, wherein the sensors are each disposed radially outwardly relative to the vanes.

17. The sensor assembly of claim 16, wherein the sensors are spaced from each other in an annular pattern.

18. The sensor assembly of claim 16, wherein the exhaust ports are each disposed radially outwardly relative to the sensors.

19. The sensor assembly of claim 11, wherein each exhaust is a one-way exhaust vent.

20. The sensor assembly of claim 11, further comprising a controller in communication with the fan and a thermocouple disposed in the housing, the thermocouple in communication with the controller.

* * * * *